(12) United States Patent
Jang

(10) Patent No.: US 10,574,604 B2
(45) Date of Patent: Feb. 25, 2020

(54) APPARATUS, METHOD, AND NON-TRANSITORY COMPUTER READABLE MEDIUM FOR PROVIDING CHAT SERVICE

(71) Applicant: LINE Corporation, Shinjuku-Ku, Tokyo (JP)

(72) Inventor: Byungkook Jang, Seongnam-si (KR)

(73) Assignee: Line Corporatian, Tokyo (JP)

( * ) Notice: Subject to any disclaimer, the term of this patent is extended or adjusted under 35 U.S.C. 154(b) by 59 days.

(21) Appl. No.: 15/948,402

(22) Filed: Apr. 9, 2018

(65) Prior Publication Data

US 2018/0295078 A1    Oct. 11, 2018

(30) Foreign Application Priority Data

Apr. 10, 2017    (KR) .................. 10-2017-0046172

(51) Int. Cl.
| | | |
|---|---|---|
| *H04L 12/58* | (2006.01) | |
| *G06Q 10/10* | (2012.01) | |
| *H04L 29/08* | (2006.01) | |

(52) U.S. Cl.
CPC ....... *H04L 51/046* (2013.01); *G06Q 10/1093* (2013.01); *H04L 51/16* (2013.01); *H04L 67/22* (2013.01); *H04L 51/10* (2013.01)

(58) Field of Classification Search
CPC .................. G06Q 10/1093; H04L 51/16
See application file for complete search history.

(56) References Cited

U.S. PATENT DOCUMENTS

| | | | | |
|---|---|---|---|---|
| 7,539,724 B1 * | 5/2009 | Callaghan | .......... | G05B 19/4185 |
| | | | | 709/205 |
| 8,200,808 B2 * | 6/2012 | Ishida | ................ | G06Q 10/0631 |
| | | | | 709/224 |

(Continued)

FOREIGN PATENT DOCUMENTS

| | | |
|---|---|---|
| JP | 2007110199 A | 4/2007 |
| KR | 20140120982 A | 10/2014 |

(Continued)

OTHER PUBLICATIONS

Republic of Korea Office Action dated Jan. 17, 2018.

(Continued)

*Primary Examiner* — Bryan Lee
(74) *Attorney, Agent, or Firm* — Harness, Dickey and Pierce, P.L.C.

(57) ABSTRACT

A method of providing a chat service may include receiving, by an input device associated with an apparatus, a first input requesting information related to a conversation content, the conversation content being a content of a conversation in a first one of chat rooms, the first input indicating which of the chat rooms is the first one of the chat rooms; receiving, by the input device, a second input specifying specified pieces of the conversation content, the specified pieces having a time frame associated therewith; determining, by a controller associated with the apparatus, statistical information related to the specified pieces of the conversation content within the time frame based on the first input and the second input; and displaying, by a display device associated with the apparatus, the statistical information within the first one of the chat rooms.

14 Claims, 11 Drawing Sheets

(56) References Cited

U.S. PATENT DOCUMENTS

2007/0198648 A1* 8/2007 Allen .................. G06Q 10/109
709/207
2007/0300164 A1* 12/2007 Bhogal ............... G06F 3/04817
715/753

FOREIGN PATENT DOCUMENTS

KR       20160036778 A    4/2016
WO    WO-2014163283 A1  10/2014

OTHER PUBLICATIONS

Kakao Apps with English translation. <https://blog.naver.com/PostPrint.nhn?blogId=htmlbooster&logNo=220471235755> Last accessed, Apr. 3, 2018.

* cited by examiner

APPARATUS, METHOD, AND NON-TRANSITORY COMPUTER READABLE MEDIUM FOR PROVIDING CHAT SERVICE

CROSS-REFERENCE TO RELATED APPLICATION

This application claims priority under 35 U.S.C. § 119 to Korean Patent Application No. 10-2017-0046172 filed on Apr. 10, 2017, in the Korean Intellectual Property Office, the entire contents of which are incorporated herein by reference.

BACKGROUND

1. Field

One or more embodiments relate to an apparatus, method, and/or non-transitory computer readable medium storing a computer program for providing a chat service.

2. Description of the Related Art

With the development of information communication technologies and technologies related to electronic devices, users are now able to use various functions through electronic devices, such as desktop computers, laptop computers, and smart phones, which are connected to a communication network, such as the Internet.

Such various functions include a function of transmitting and receiving data between the electronic devices via wired/wireless communication. Accordingly, a multi-party chat service may be provided via a method of transmitting and receiving a visual sign and/or an auditory signal between the electronic devices, and displaying the visual signal and/or emitting the auditory signal on the electronic devices.

As such a chat service is activated, users may converse with each other through various chat rooms. However, the amount of content associated with the conversation may be relatively large such that it may be difficult to find the content of a specific conversation.

Information disclosed in this Background section was already known to the inventors before achieving the inventive concept or is technical information acquired in the process of achieving the inventive concept. Therefore, it may contain information that does not form the prior art that is already known to the public in this country.

SUMMARY

This section provides a general summary of the inventive concept, and is not a comprehensive disclosure of its full scope or all features of the inventive concept.

One or more embodiments include an apparatus, method, and/or non-transitory computer readable medium storing computer program for providing a chat service, which provide, according to certain time, statistical information related to past conversation content when providing a multi-party chat service.

One or more example embodiments include an apparatus, method, and/or non-transitory computer readable medium storing computer program for providing a chat service, which provide, according to certain time, statistical information related to a certain type of conversation content among past conversation content when providing a multi-party chat service.

One or more example embodiments include an apparatus, method, and/or non-transitory computer readable medium storing computer program for providing a chat service, which provide statistical information related to past conversation content when providing a multi-party chat service, and when a user selects a specific time slot based on the statistical information, display conversation content transmitted and received at the certain time slot.

Additional aspects will be set forth in part in the description which follows and, in part, will be apparent from the description, or may be learned by practice of the example embodiments.

At least one example embodiment relates to a method of providing a chat service, the chat service facilitating an exchange of a conversation through chat rooms on-line between an apparatus and at least one external electronic device. In some example embodiments, the method includes receiving, by an input device associated with the apparatus, a first input requesting information related to a conversation content, the conversation content being a content of the conversation in a first one of chat rooms, the first input indicating which of the chat rooms is the first one of the chat rooms; receiving, by the input device, a second input specifying specified pieces of the conversation content, the specified pieces having a time frame associated therewith; determining, by a controller associated with the apparatus, statistical information related to the specified pieces of the conversation content within the time frame based on the first input and the second input; and displaying, by a display device associated with the apparatus, the statistical information within the first one of the chat rooms.

At least one example embodiment relates to a non-transitory computer readable medium storing program code that, when executed, configures a processor associated with the apparatus to execute a method of providing a chat service.

At least one example embodiment relates to an apparatus configured to provide a chat service, the chat service facilitating an exchange of a conversation through chat rooms on-line between the apparatus and at least one external electronic device, the apparatus including an input device configured to, receive a first input requesting information related to conversation content, the conversation content being a content of the conversation in a first one of the chat rooms, the first input indicating which of the chat rooms is the first one of the chat rooms, and receive a second input specifying specified pieces of the conversation content, the specified pieces having a time frame associated therewith; a controller configured to determine statistical information related to the specified pieces of the conversation content within the time frame based on the first input and the second input; and a display device configured to display the statistical information within the first one of the chat rooms.

BRIEF DESCRIPTION OF THE DRAWINGS

Example embodiments will be described in more detail with regard to the figures, wherein like reference numerals refer to like parts throughout the various figures unless otherwise specified, and wherein.

Figure 1:
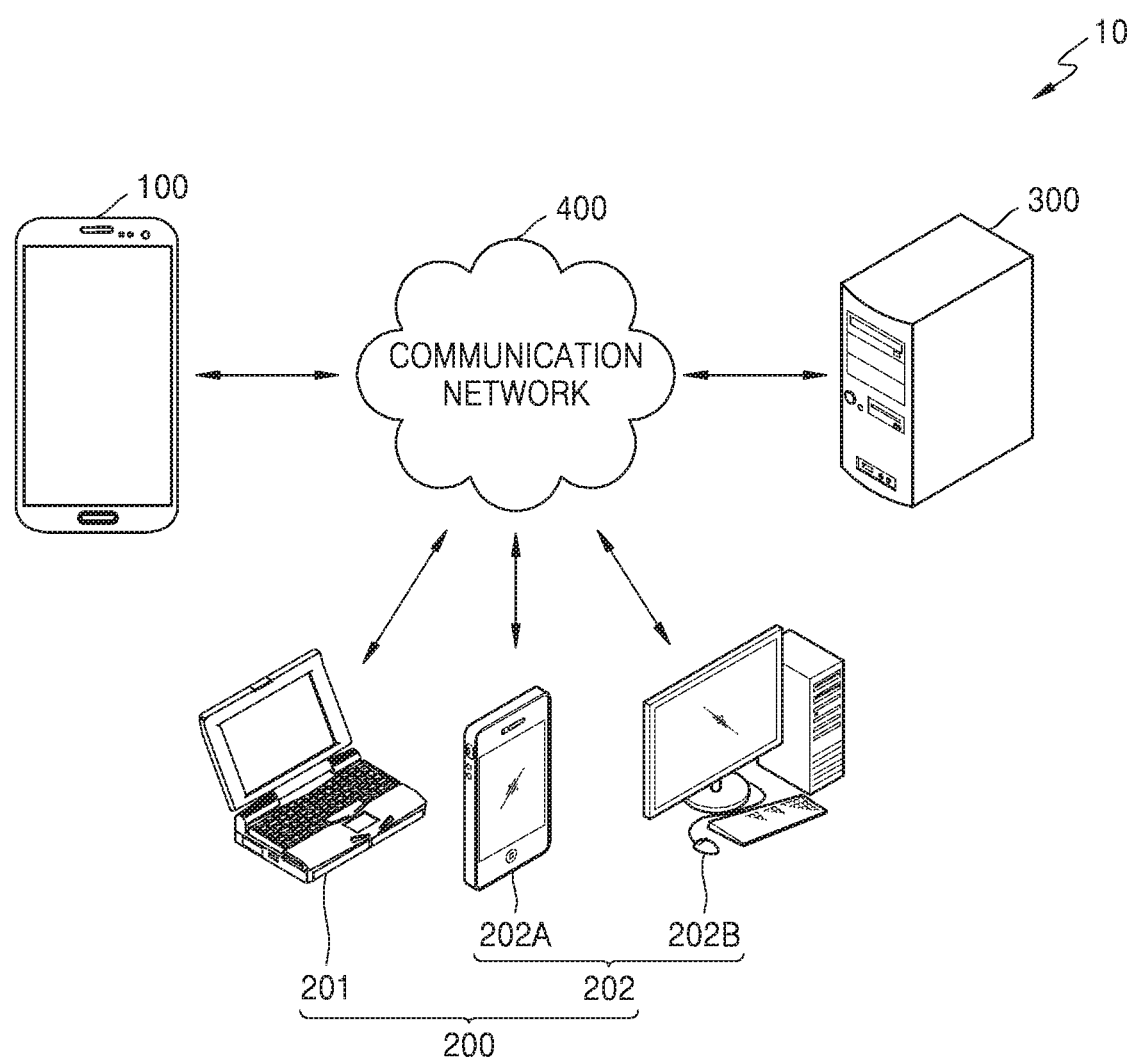
FIGS. 1 and 2 are diagrams of a configuration of a system for providing a chat service, according to example embodiments.

It should be noted that these figures are intended to illustrate the general characteristics of methods and/or structures utilized in certain example embodiments and to supplement the written description provided below. These drawings are not, however, to scale and may not precisely reflect the precise structural or performance characteristics of any given example embodiment, and should not be interpreted as defining or limiting the range of values or properties encompassed by the example embodiments.

DETAILED DESCRIPTION

One or more example embodiments will be described in detail with reference to the accompanying drawings. Example embodiments, however, may be embodied in various different forms, and should not be construed as being limited to only the illustrated embodiments. Rather, the illustrated example embodiments are provided as examples so that this disclosure will be thorough and complete, and will fully convey the concepts of this disclosure to those of ordinary skill in the art. Accordingly, known processes, elements, and techniques, may not be described with respect to some example embodiments. Unless otherwise noted, like reference characters denote like elements throughout the attached drawings and written description, and thus descriptions will not be repeated.

Although the terms "first," "second," "third," etc., may be used herein to describe various elements, components, regions, layers, and/or sections, these elements, components, regions, layers, and/or sections, should not be limited by these terms. These terms are only used to distinguish one element, component, region, layer, or section, from another region, layer, or section. Thus, a first element, component, region, layer, or section, discussed below may be termed a second element, component, region, layer, or section, without departing from the scope of this disclosure.

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups, thereof. As used herein, the term "and/or" includes any and all combinations of one or more of the associated listed items. Expressions such as "at least one of," when preceding a list of elements, modify the entire list of elements and do not modify the individual elements of the list. Also, the term "exemplary" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element, there are no intervening elements present.

Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Example embodiments may be described with reference to acts and symbolic representations of operations (e.g., in the form of flowcharts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

Units and/or devices according to one or more example embodiments may be implemented using hardware, software, and/or a combination thereof. For example, hardware devices may be implemented using processing circuitry such as, but not limited to, a processor, a central processing unit (CPU), a controller, an arithmetic logic unit (ALU), a digital signal processor, a microcomputer, a field programmable gate array (FPGA), a system-on-chip (SoC), a programmable logic unit, a microprocessor, or any other device capable of responding to and executing instructions in a defined manner.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, a CPU, a controller, an ALU, a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording media, including tangible or non-transitory computer-readable storage media discussed herein.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such a separate computer readable storage medium may include a universal serial bus (USB) flash drive, a memory stick, a Blu-ray/DVD/CD-ROM drive, a memory card, and/or other similar computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other similar medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device; however, one of ordinary skill in the art will appreciate that a hardware device may include multiple processing elements and multiple types of processing elements. For example, a hardware device may include multiple processors or a processor and a controller. In addition, other processing configurations are possible, such as parallel processors.

Although described with reference to specific examples and drawings, modifications, additions and substitutions of example embodiments may be variously made according to the description by those of ordinary skill in the art. For example, the described techniques may be performed in an order different to that of the methods described, and/or components such as the described system, architecture, devices, circuit, and the like, may be connected or combined to be different from the above-described methods, or results may be appropriately achieved by other components or equivalents.

Figure 2:
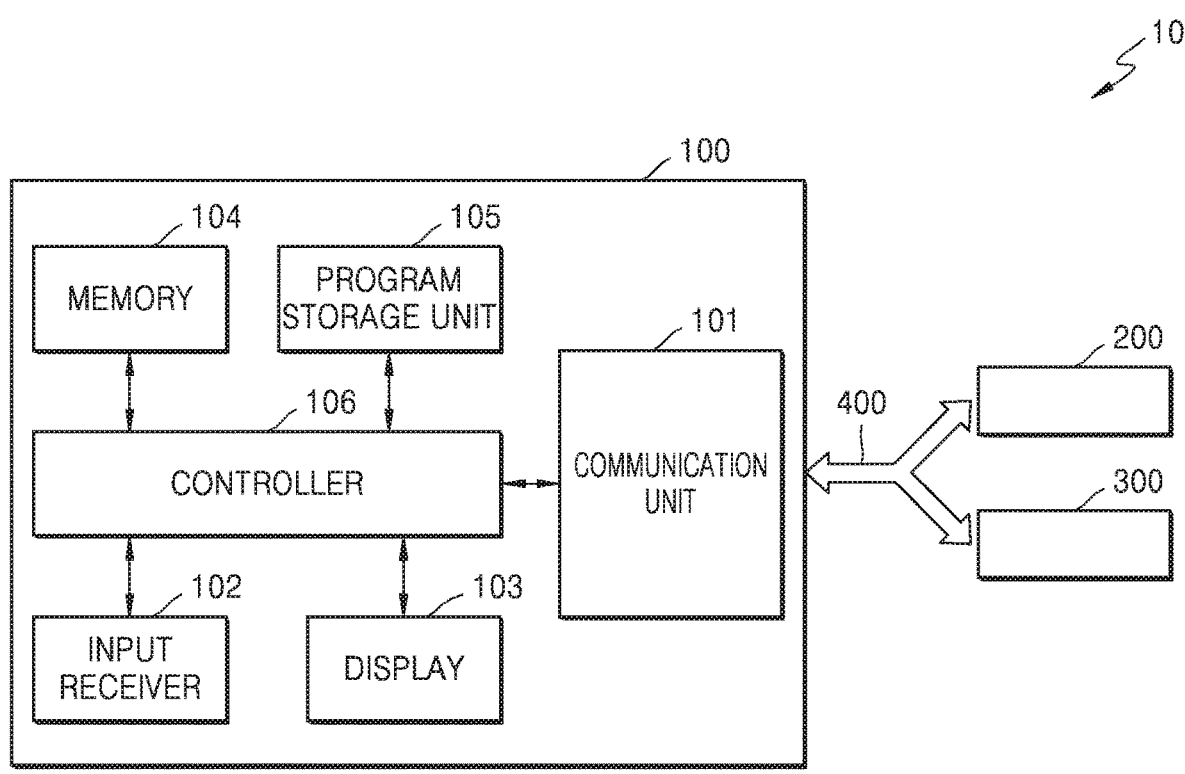

FIGS. 1 and 2 are diagrams of a configuration of a system 10 for providing a chat service, according to embodiments.

Referring to FIG. 1, the system 10 according to an example embodiment may include an apparatus 100 for providing a chat service, external electronic devices 200, a server 300 for providing a chat service, and a communication network 400.

The apparatus 100 may denote a communication terminal capable of transmitting and/or receiving an electronic signal to and from the external electronic device 200 in a wired/wireless communication environment. In this, case the electronic signal may include information about a visual sign and/or auditory information. The apparatus 100 may provide a conversation function through the visual sign by analyzing the electronic signal and displaying, on the apparatus 100 the visual sign included in the electronic signal.

In example embodiments, a visual sign may indicate any sign visually recognized like an alphabet, a drawing, or a photograph, and may denote an object capable of transmitting information to another party in a visual form or a set of such objects. For example, a visual sign may include a text message, a drawing, a photograph, a sentence and/or emoticon generated by combining thereof, which is displayable on a display of the apparatus 100, but is not limited thereto.

The apparatus 100 and the external electronic apparatus 200 may participate in a chat room. In example embodiments, a chat room may be a type of a user interface (UI) displayed on the display of the apparatus 100 and/or a display of the external electronic device 200, and may be a region of the UI where visual signs transmitted and received between the apparatus 100 and the external electronic device 200 are displayed.

A plurality of the external electronic devices 200 may be included in one system 10. For example, a first external electronic device 201, a second external electronic device 202A, and a third external electronic device 202B may receive a chat service through a chat room with the apparatus 100 in the system 10. However, example embodiments are not limited thereto, for example, there may be more than three devices interacting through the chat service.

In some example embodiments, accounts participating in the chat room may respectively correspond to the apparatus 100 and the external electronic devices 200, In other example embodiments, some of the external electronic devices 200 may participate in the chat room via one account. For example, the second external electronic device 202A and the third external electronic device 202B may have the same account. In this case, the second external electronic device 202A and the third external electronic device 202B may be collectively referred to as a second external electronic device 202, and the second external electronic device 202 may participate in the chat room via one account.

In example embodiments, an account may be similar to a user identification (ID), and may denote a qualification to participate in a chat room, wherein the qualification is generated or assigned for a user of the apparatus 100 to chat with users of the external electronic devices 200 in the chat room. In other words, the user of the apparatus 100 may participate in the chat room via an account associated with the user. As described above, when one user uses two or more electronic devices, the user may use one account for all of the electronic devices.

In FIG. 1, electronic devices, such as a smartphone, a desktop computer, and a laptop computer, are illustrated as examples of the apparatus 100 and the external electronic devices 200. However, example embodiments are not limited thereto, and any electronic device capable of transmitting and receiving data to and from another electronic device in a wired/wireless communication environment may be used as the apparatus 100 or the external electronic device 200.

Examples of the apparatus 100 and/or the external electronic device 200 may include a tablet personal computer (PC), a smart television (TV), a personal digital assistant (PDA), a media player, a micro-server, a global positioning system (GSP) device, an electronic book terminal, a digital broadcasting terminal, a navigation device, a kiosk, an MP3 player, a digital camera, a wearable device, and other mobile or non-mobile computing devices, but are not limited thereto. In addition, examples of the apparatus 100 and/or the external electronic device 200 may include various devices capable of receiving a touch input, such as an electronic board and a touch table. Also, examples of the apparatus 100 and/or the external electronic device 200 may include accessories, such as a watch, glasses, a hair band, and a ring, which have a communication function and a data processing function, but are not limited thereto.

The server 300 may be a server used to provide a chat service. One server is illustrated in FIG. 1, but a plurality of servers that are connected to each other in a wired/wireless communication manner may exist based on traffic or an amount of data.

The server 300 may store the visual signs and/or the auditory signals exchanged between the apparatus 100 and the external electronic device 200. Also, the server 300 may store information about whether a chat room generated between the apparatus 100 and all or some of the external electronic devices 200 exists, a point of time when the chat room is opened, information about terminals or accounts participating in the chat room, and information about visual signs displayed in the chat room and/or auditory signals emitted in the chat room.

The server 300 may provide data received from any one of the apparatus 100 and the external electronic device 200 to all or some of the apparatus 100 and the external electronic device 200.

The server 300 may provide not only services of transmitting/receiving and storing the visual sign, but also a general search service and other various services enhancing user convenience. In other words, the server 300 may provide, in addition to data transmitting/receiving service, various services, such as a search service, an email service, a blog service, a social network service (SNS), a news service, and/or shopping information providing service.

Alternatively, the server 300 may be an apparatus included in a server providing a portal service, such as a search service, an email service, a news service, or a shopping service. The server providing a portal service may be a server providing a webpage provided by the portal service to the apparatus 100 and/or the external electronic device 200 requesting the portal service to provide information. Here, the server 300 and the server providing the portal service may be separate servers physically separated from each other or may be one server only conceptually separated.

In some example embodiments, the apparatus 100 and the external electronic device 200 may directly transmit and receive data between each other through the communication network 400. However, in other example embodiments, the data may be transmitted and received between the apparatus 100 and the external electronic device 200 only through the server 300. In other words, for example, a visual signal in an electronic signal may be transmitted from the apparatus 100 to the server 300 via the communication network 400, and then transmitted from the server 300 to the external electronic device 200 through the communication network 400.

The communication network 400 may connect the apparatus 100, the external electronic device 200, and the server 300 to each other. Examples of the communication network 400 may include wired networks, such as a local area network (LAN), a wide area network (WAN), a metropolitan area network (MAN), and an integrated service digital network (ISDN), and wireless networks, such as wireless LAN, a code division multiple access (CDMA), Bluetooth, and a satellite communication network, but are not limited thereto.

Referring to FIG. 2, the apparatus 100 may include a communication unit 101, an input receiver 102, a display 103, a memory 104, a program storage unit 105, and a controller 106.

The communication unit 101 may communicate with the external electronic device 200 or the server 300 through the communication network 400, wirelessly or via wires. The communication unit 101 may transmit and receive data including a visual sign to and from the external electronic device 200 or the server 300, through the communication network 400. The communication unit 101 may be a Bluetooth communication unit, a Bluetooth low energy (BLE) communication unit, a near field communication unit, a wireless local area network (WLAN) communication unit, a Zigbee communication unit, an infrared data association (IrDA) communication unit, a Wi-Fi direct (WFD) communication unit, an ultra wideband (UWB) communication unit, or an Ant+ communication unit, but is not limited thereto.

The input receiver 102 may receive a user input for a chat service through a visual sign. For example, the input receiver 102 may receive user's voice input, user's character input, or a user's touch input, but a user input is not limited thereto. The input receiver 102 may be configured as a touch screen by forming a layer structure with the display 103. In this case, the display 103 and the input receiver 102 may form one physical structure.

The display 103 may display information processed by the apparatus 100. The display 103 may display visual signs transmitted and received between the apparatus 100 and the external electronic device 200. For example, the display 103 may display a chat room including conversation content between the user of the apparatus 100 and the user of the external electronic device 200, and visual signs may be displayed in the chat room. Information about existence of the chat room may be stored in the apparatus 100 participating in the chat room, or in the server 300. In this case, the display 103 may directly display the visual signs or display an interface for notifying that the visual signs are received. For example, when the visual sign is a text message or a drawing, the display 103 may directly display the text message or the drawing. As another example, when the visual sign is an electronic document that is unable to be directly executed by the apparatus 100, the display 103 may display a specific interface indicating the electronic document.

The display 103 may include at least one of a liquid crystal display, a thin film transistor-liquid crystal display, an organic light-emitting diode, a 3-dimensional (3D) display, and an electrophoretic display, but is not limited thereto. According to an example embodiment of the apparatus 100, the apparatus 100 may include two or more displays 103.

The memory 104 may be embodied as various non-transitory computer-readable media including magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. The non-transitory computer-readable media may also be a distributed network, so that the program instructions are stored and executed in a distributed fashion.

The memory 104 may perform a function of temporarily or permanently storing data processed by the controller 106. Here, the memory 104 may include a magnetic storage medium or a flash storage medium, but is not limited thereto. The memory 104 may perform a function of storing visual signs transmitted and received with the external electronic device 200 or the server 300.

The program storage unit 105 may be a component for performing various operations while providing a chat service. The program storage unit 105 may be a volatile memory device that is a working space for the controller 106.

The controller 106 may generally control overall operations of the apparatus 100. For example, the apparatus 106 may generally control the communication unit 101, the input receiver 102, the display 103, the memory 104, and other components included in the apparatus 100 by executing software stored in the program storage unit 105 included in the apparatus 100.

The controller 106 may include any type of device capable of processing data, such as a processor. Here, the 'processor' may denote, for example, a data processing apparatus embedded in hardware and having a physically structured circuit to perform a function expressed in a code or command included in a program. Examples of the data processing apparatus embedded in hardware may include a microprocessor, a central processing unit (CPU), a processor core, a multiprocessor, an application specific integrated circuit (ASIC), and a field programmable gate array (FPGA), but are not limited thereto.

The controller 106 may be configured, through a layout design or execution of computer readable instructions stored in the program storage unit 105 as a special purpose computer to provide a chat service facilitating an exchange of a conversation, via online chat rooms, between a user of the apparatus 100 and a user of the external device 200, and to generate and update graphical user interfaces (GUIs) on the display 103 based on the contents of the conversation. In some example embodiments, the controller 106 may be configured, a layout design or execution of computer readable instructions stored in the program storage unit 105 as a special purpose computer to generate statistical information related to specified pieces of the contents of the conversation, and generate and/or update the GUI to display the statistical information. Therefore, the controller 106 may improve the functioning of the apparatus 100 itself by increasing the user's ability to find and view a specific conversation.

Figure 3:
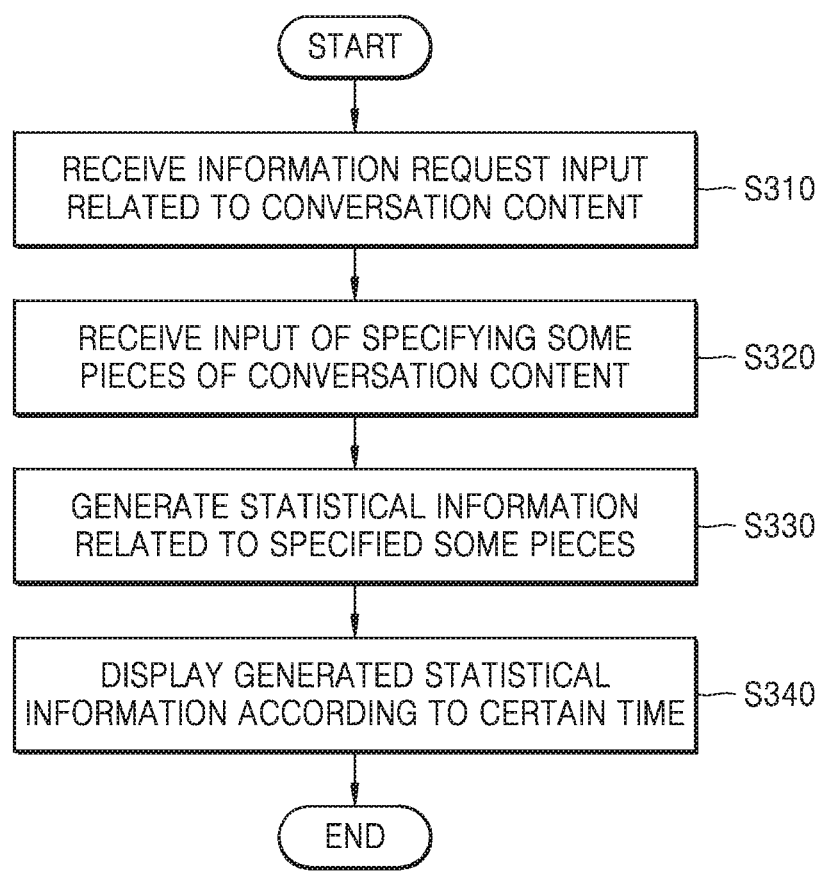
FIGS. 3 through 6 are flowcharts of a method of providing a chat service, according to example embodiments.

FIG. 3 is a flowchart of a method of providing a chat service according to example embodiments.

Referring to FIG. 3, in operation S310, the apparatus 100 may receive a first input that includes an information request related to conversation content.

For example, the apparatus 100 may receive the first input of requesting information related to conversation content in a chat room. Here, the first input may request information related to conversation content in a specific chat room. In this case, the first input may be input in relation to the specific chat room while a UI related to the specific chat room is displayed on the display 103. In this case, the first input may be an input of touching a UI at a specific location of the specific chat room when the specific chat room is displayed on the display 103.

In operation S320, the apparatus 100 may receive a second input that specifies some pieces of the conversation content.

For example, the conversation content in the chat room may include text, a drawing, a video, and/or a voice message. In operation S320, the apparatus 100 may receive the second input of selecting a type of information desired from the conversation content. For example, the second input may be an input of requesting information related to text in the conversation content. As another example, the second input may be an input of requesting information related to an image in the conversation content.

In operation S330, the apparatus 100 may generate statistical information related to the specified some pieces of the conversation content.

For example, the apparatus 100 may generate statistical information related to the conversation content in the chat room, in response to one or more of the first input and the second input. The apparatus 100 may generate the statistical information related to only the specified some pieces of the conversation content, in response to the second input. Alternatively, the apparatus 100 may pre-generate statistical information related to each piece of the conversation content, and select only statistical information related to the specified some pieces when the second input is received.

The apparatus 100 may organize the statistical information according to certain time. Here, the certain time may be dates. For example, the apparatus 100 may classify the conversation content in the chat room according to dates, and organize statistical information related to the conversation content per date.

For example, a total 200 pieces of conversation content may be in a specific chat room on Feb. 20, 2017, wherein 170 pieces are text, 25 pieces are images, and 5 pieces are videos. Similarly, a total 150 pieces of conversation content may be in the specific chat room on Feb. 21, 2017, wherein 140 pieces are text, 8 pieces are images, and 2 pieces are videos. Similarly, a total 240 pieces of conversation content may be in the specific chat room on Feb. 22, 2017, wherein 220 pieces are text and 20 pieces are images.

In this case, when the first input is received with respect to the specific chat room, the apparatus 100 may generate statistical information indicating that there are 200 pieces of conversation content on Feb. 20, 2017, 150 pieces of conversation content on Feb. 21, 2017, and 240 pieces of conversation content on Feb. 22, 2017. Then, when the second input of selecting text is received, the apparatus 100 may generate statistical information indicating that 170 pieces of text are transmitted and received on Feb. 20, 2017, 140 pieces of text are transmitted and received on Feb. 21, 2017, and 220 pieces of text are transmitted and received on Feb. 22, 2017.

As such, the apparatus 100 may generate statistical information indicating how many of the some pieces specified by the second input exist per date.

In operation S340, the apparatus 100 may display the generated statistical information according to certain time.

For example, the apparatus 100 may display, through the display 103 of the apparatus 100, the statistical information generated through operation S330. In this case, the apparatus 100 may display a UI indicating a calendar on the display 103, and provide the statistical information on the calendar. For example, when the certain time is dates, the apparatus 100 may display the UI indicating the calendar on the display 103, and display the statistical information on each date of the calendar. In other words, the apparatus 100 may display, on the calendar, how many pieces of the conversation content specified by the second input exist on each date.

Here, the apparatus 100 may provide information about how many pieces of the conversation content specified by the second input exist on each date via any one of various methods.

For example, the apparatus 100 may directly indicate the number of pieces specified by the second input on each date of the calendar. For example, when the second input is an input of selecting text, the apparatus 100 may indicate how many pieces of text are transmitted and received in the chat room per date, by displaying the number of 170 in a region indicating Feb. 20, 2017, the number of 140 in a region indicating Feb. 21, 2017, and the number of 220 in a region indicating Feb. 22, 2017 on the calendar. As another example, when the second input is an input of selecting a video, the apparatus 100 may indicate how many videos are transmitted and received in the chat room per date, by displaying the number of 5 in the region indicating Feb. 20, 2017, the number of 2 in the region indicating Feb. 21, 2017, and the number of 0 in the region indicating Feb. 22, 2017 on the calendar.

Selectively, the apparatus 100 may further receive an input of selecting at least one specific time from the certain time after displaying the statistical information, and delete conversation content at the selected at least one specific time from the chat room. At this time, the apparatus 100 may simply delete the conversation content only from the display 103, or may delete the conversation content from all of the apparatus 100 and the external electronic device 200 by requesting the server 300 to delete the conversation content. Operation examples of the method according to an example embodiment will be described with reference to FIGS. 7 through 11.

FIGS. 7 through 10 illustrate examples of providing a chart service by the apparatus 100, according to example embodiments.

Figure 7:
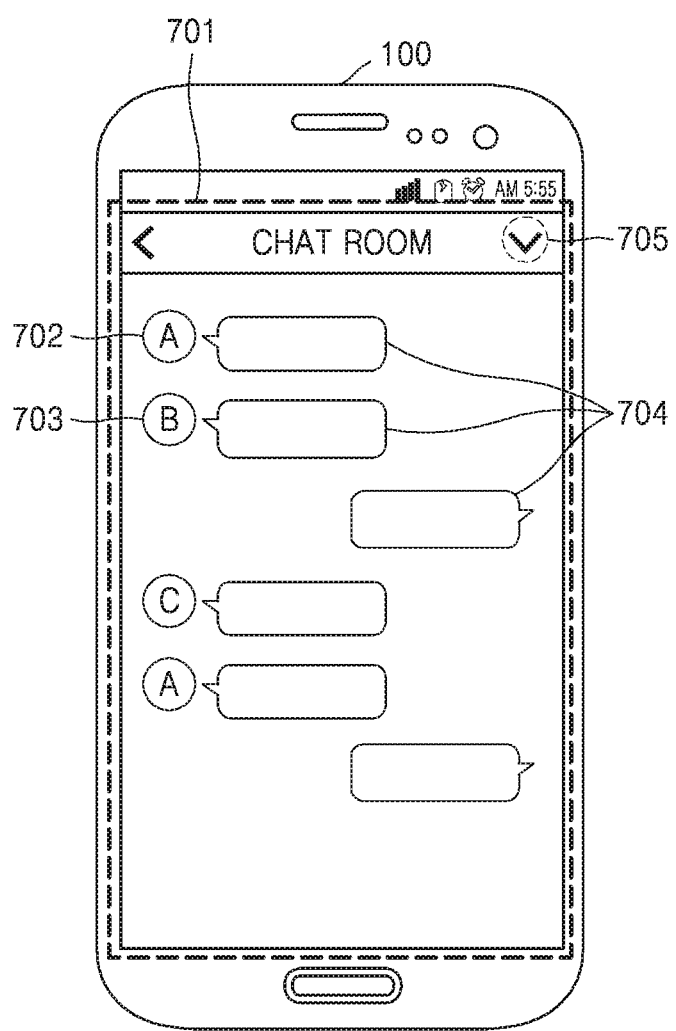
FIGS. 7 through 11 illustrate examples of providing a chart service by an apparatus for providing a chat service, according to example embodiments.

Referring to FIG. 7, the apparatus 100 ma generate and display a chat room UI 701. Such a chat room may display a UI for displaying pieces of conversation content transmitted and received between the apparatus 100 and the external electronic apparatuses 200. For example, the chat room UI 701 may display a UI 702 indicating a user A of the external electronic device 200, and a UI 703 indicating a user B of the external electronic device 200. Accordingly, users who transmitted the pieces of conversation content in the chat room may be distinguished. Also, the chat room UI 701 may display pieces 704 of conversation contents between the users. Here, the chat room UI 701 may display a UI 705 for receiving a special function request. The UI 705 may be a pull down menu.

Figure 8:
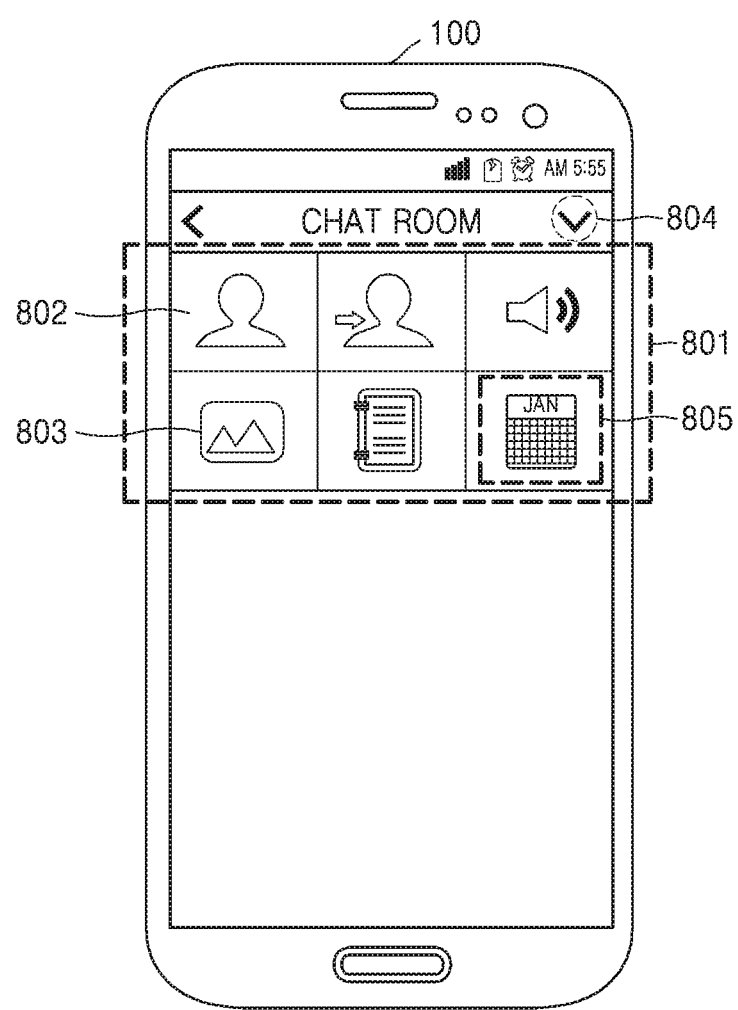

When a touch input or the like is received on the UI 705, a UI 801 indicating special functions may be displayed as shown in FIG. 8.

Referring to FIG. 8, the UI 801 indicating special functions may include a UI 802 for receiving a user profile checking request and a UI 803 for receiving an image attaching request, and also a UI 805 for receiving a request for statistical information related to conversation content according to one or more example embodiments. Meanwhile, the chat room may include a UI 804 for receiving a special function closing request, and when an input of selecting the UI 804 is received, the UI 701 of FIG. 7 may be displayed. In the current embodiment, an input of touching the UI 805 for receiving the request for statistical information may be the first input.

Figure 9:
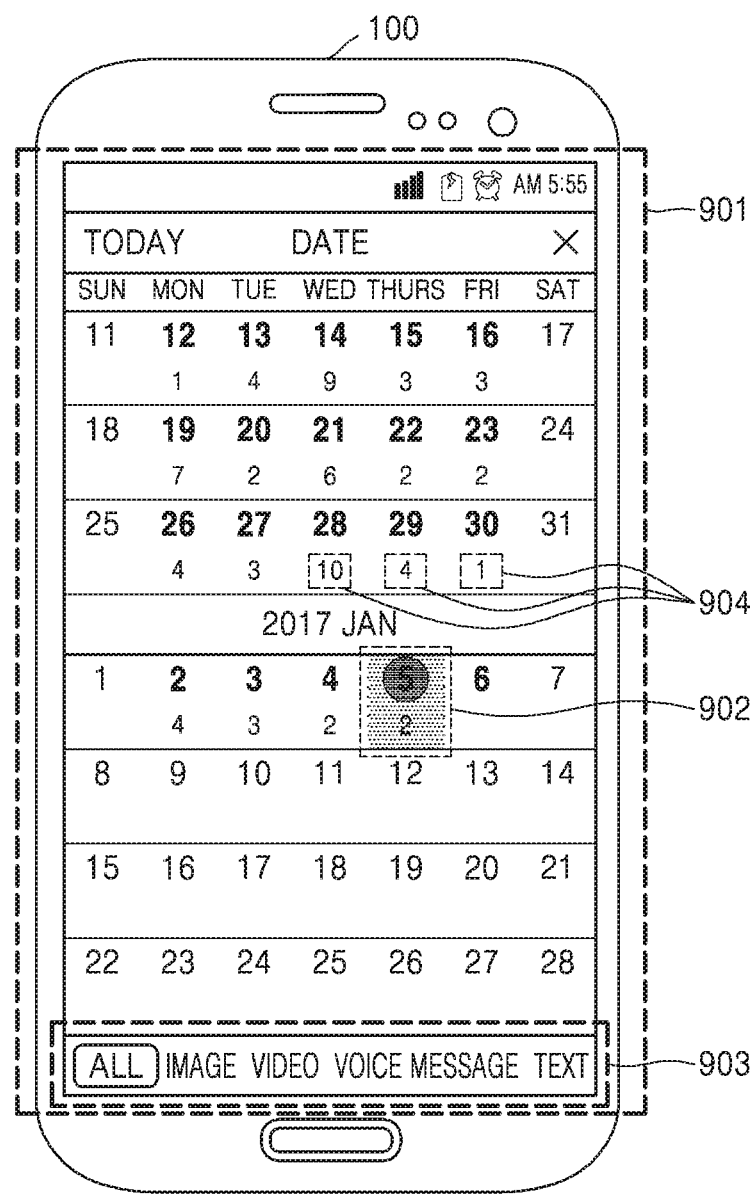

A calendar UI 901 of FIG. 9 may be displayed when the input of touching the UI 805 is received.

Referring to FIG. 9, the apparatus 100 may display, on the display 103, the calendar UI 901 for providing statistical information organized according to dates. The calendar UI 901 may display dates before and after a reference date 902, based on the reference date 902.

Here, the reference date 902 may be a date when pieces of conversation content displayed on the display 103 were transmitted and received at a point of time when the first input is received, from among conversation content in the chat room. Alternatively, the reference date 902 may be a date when statistical information is provided upon receiving the first input.

For example, a date of receiving the first input may be Feb. 22, 2017, and pieces of conversation content displayed in the chat room when the first input is received may have been transmitted and received on Jan. 10, 2017. In this case, the apparatus 100 may determine the reference date 920 to be Feb. 22, 2017, i.e., the date when the first input is received, or to be Jan. 10, 2017, i.e., the date when the pieces of conversation content displayed in the chat room were transmitted and received when the first input is received. A criterion of determining the reference date 902 may be assigned by a manager providing the chat service or a user using the apparatus 100.

The apparatus 100 may execute calendar UI 901 such that the calendar UI 901 includes the UI 903 for receiving the second input. The UI 903 for receiving the second input may display UIs for receiving an input of specifying some pieces of the conversation content, such as "All", "Image", "Video", "Voice Message", and "Text". For example, when the user selects "Image" from among the UIs displayed in the UI 903, the apparatus 100 may determine that the second input is for requesting statistical information related to images from among the conversation content.

In this case, the apparatus 100 may provide, on the calendar UI 901, statistical information corresponding to the second input. For example, when the second input requests the statistical information related to images, the apparatus 100 may display a number UI 904 indicating how many images were transmitted and received through the chat room on each date. In other words, when the number of images transmitted and received on Dec. 28, 2016 is 10, the number of images transmitted and received on Dec. 29, 2016 is 4, and the number of images transmitted and received on Dec. 30, 2016 is 1, the apparatus 100 may display such numbers in regions corresponding to the dates on the calendar UI 901, as shown in FIG. 9.

However, example embodiments are not limited thereto, and, the apparatus 100 may display statistical information in forms other than numerically.

Figure 10:
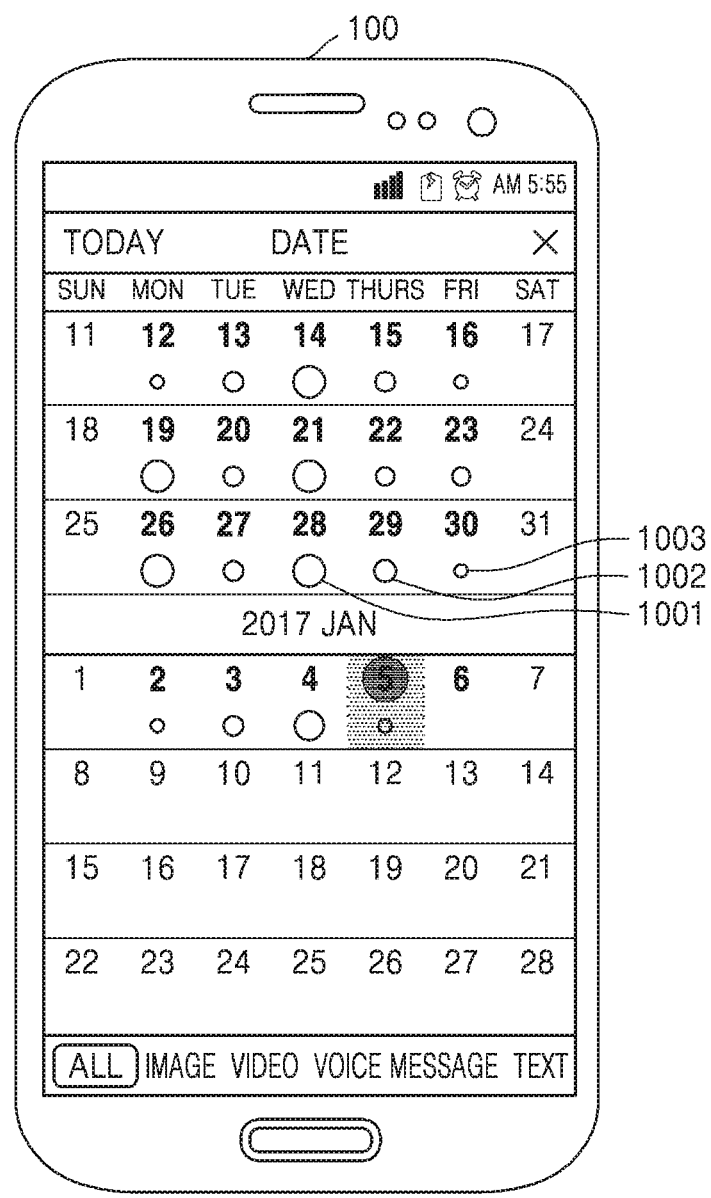

For example, referring to FIG. 10, the apparatus 100 may display, on a calendar UI, statistical information in a form other than the number. For example, the apparatus 100 may display circular UIs 1001 through 1003 having different sizes in regions corresponding to dates. Here, the sizes of the circular UIs 1001 through 1003 may be proportional to the number of pieces of conversation content transmitted and received in the chat room. In other words, when the second input requests statistical information related to videos from among the conversation content, and when the number of videos transmitted and received on Dec. 28, 2016 is the highest, the number of videos transmitted and received on Dec. 30, 2016 is lowest, and the number of videos transmitted and received on Dec. 29, 2016 is the middle, the apparatus 100 may display the largest circular UI 1001 in a region corresponding to December 28, the medium-sized circular UI 1002 in a region corresponding to December 29, and the smallest circular UI 1003 in a region corresponding to December 30 on the calendar UI, as shown in FIG. 10. As such, the apparatus 100 may provide a UI for identifying the number of pieces of conversation content on each date by using an intuitive geometrical form rather than a number.

Figure 4:
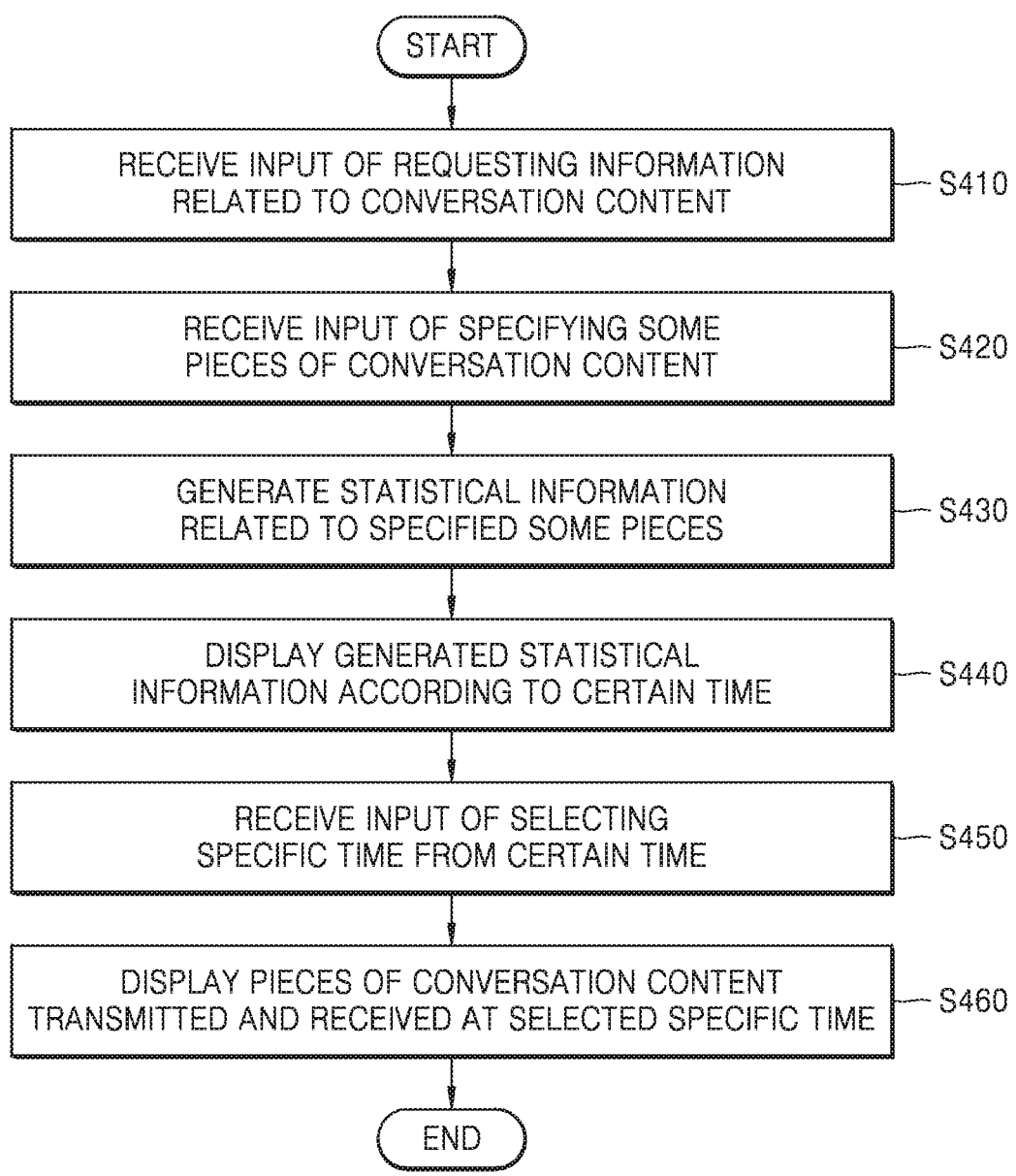

FIG. 4 is a flowchart of a method of providing a chat service according to example embodiments.

Referring to FIG. 4, the apparatus 100 performing the method according to an example embodiment may receive an input of requesting information related to conversation content in operation S410, receiving an input of specifying some pieces of the conversation content in operation S420, generating statistical information related to the specified some pieces in operation S430, displaying the generated statistical information according to certain time in operation S440. Operations S410 to S440 may be substantially similar to operations S310 to S340, and, thus, repeated description will be omitted for the sake of brevity.

In operation S450, the apparatus 100 may receive an input of selecting a specific time from the certain time in operation S450.

For example, the apparatus 100 may receive the input of selecting the specific time on a calendar UI displayed on the display 103. Such an input may be an input of selecting a specific date on the calendar UI.

In operation S460, the apparatus 100 may display pieces of conversation content transmitted and received at the selected specific time. For example, when the user of the apparatus 100 selects Dec. 28, 2016 on the calendar UI, the apparatus 100 may display pieces of conversation content transmitted and received on Dec. 28, 2016, on the display 103.

Here, the apparatus 100 may change a state of a chat room such that the pieces of conversation content transmitted and received at the selected specific time are displayed in response to a user input, while ending the displaying of the statistical information. In this case, the user input may be referred to as a third input.

Alternatively, the apparatus 100 may display at least some of the pieces of conversation content transmitted and received at the specific time in response to a user input, while maintaining the displaying of the statistical information. In this case, the user input may be referred to as a fourth input.

For example, when the user of the apparatus 100 quickly and continuously touches the specific date twice on the calendar UI, the apparatus 100 may determine such a touch is the third input. In this case, the apparatus 100 may change the state of the chat room such that the pieces of conversation content transmitted and received on the specific date are displayed, while ending the displaying of the calendar UI. Accordingly, the user of the apparatus 100 may identify the pieces of conversation content transmitted and received on the specific date including a desired piece of conversation content.

For example, when the user of the apparatus 100 touches a specific date on the calendar UI and maintains the touch, the apparatus 100 may determine that such a touch is the fourth input. In this case, the apparatus 100 may display, on the display 103, some of pieces of conversation content transmitted and received on the specific date in a popup form, while maintaining the displaying of the calendar UI. Accordingly, the user of the apparatus 100 may easily determine whether a piece of conversation content desired by the user is transmitted or received on the specific date.

In the above examples, the third input is an input of continuously touching the specific date twice and the fourth input is an input of touching the specific date and maintaining the touch, but the third and fourth inputs are not limited thereto. In other words, types of the third and fourth inputs may vary as long as the apparatus 100 is able to distinguish the third and fourth inputs.

Figure 5:
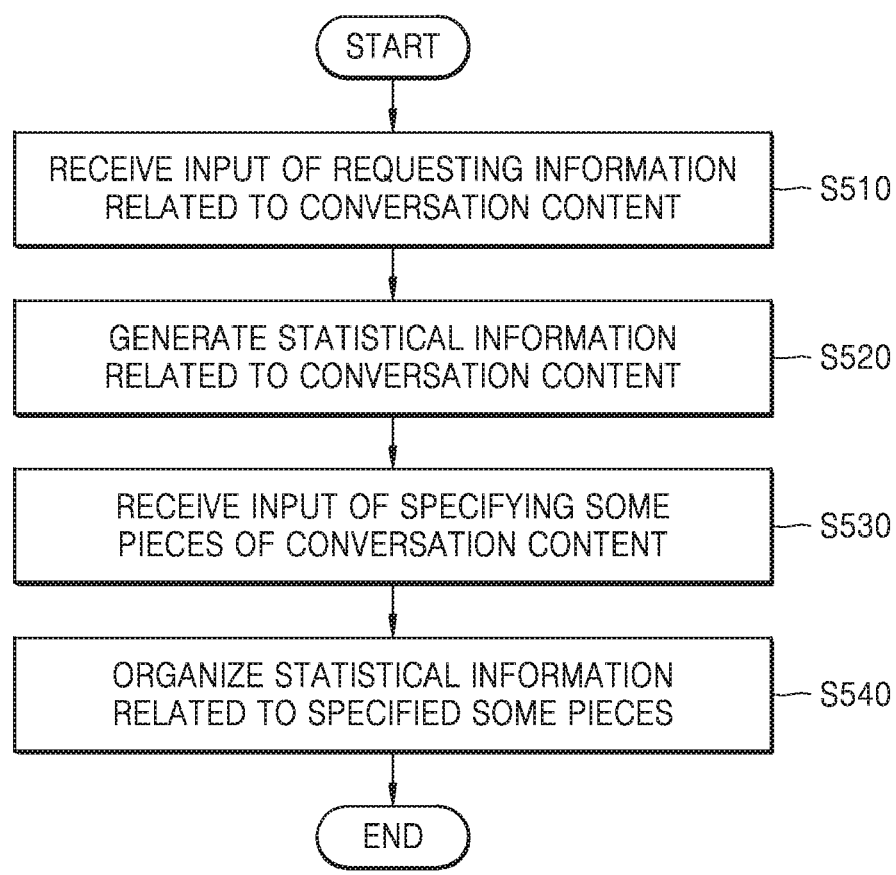

FIG. 5 is a flowchart of a method of providing a chat service according to example embodiments.

Referring to FIG. 5, in operation S510, the apparatus 100 may receive an input of requesting information related to conversation content. Operation S510 may be substantially similar to operation S310, and, thus, repeated description will be omitted for the sake of brevity.

Thereafter, unlike the method of FIG. 3, in operation S520, the apparatus 100 may instead immediately generate statistical information related to the conversation content. At this time, the apparatus 100 may generate statistical information related to all pieces of the conversation content in a chat room, or statistical information related to some pieces of the conversation content.

For example, the apparatus 100 may generate statistical information related to all pieces of the conversation content in the chat room from a point of time when the chat room is opened to a point of time when the information related to the conversation content is requested. As another example, the apparatus 100 may generate statistical information related only to pieces of conversation content in the chat room within a certain period from the point of time when the information related to the conversation content is requested, wherein the certain period is specified. As another example, the apparatus 100 may generate statistical information related only to a date to be displayed on the display 103 of the apparatus 100. As another example, the apparatus 100 may generate statistical information related only to dates including certain spare dates from a date to be displayed on the display 103 of the apparatus 100.

When the statistical information is generated in relation to only some pieces of the conversation content in the chat room, and the user of the apparatus 100 performs a scrolling operation on a calendar displayed on the display 103, the apparatus 100 may determine whether statistical information related to a date displayed on the display 103 is generated. When there is a date where statistical information is not generated from among dates displayed on the display 103, the apparatus 100 may generate statistical information at a point of time when such a date is displayed on the display 103.

In operation S530, the apparatus 100 may receive an input of specifying some pieces of the conversation content.

In operation S540, the apparatus 100 may immediately organize statistical information related to the specified some pieces in response to the input specifying the some pieces.

In other words, the apparatus 100 may first generate statistical information related to all pieces of conversation content in a chat room selected via a first input, in response to the first input. Then, when a second input is additionally received, the apparatus 100 may select statistical information related only to some pieces of the conversation content specified via the second input, in response to the second input.

Figure 6:
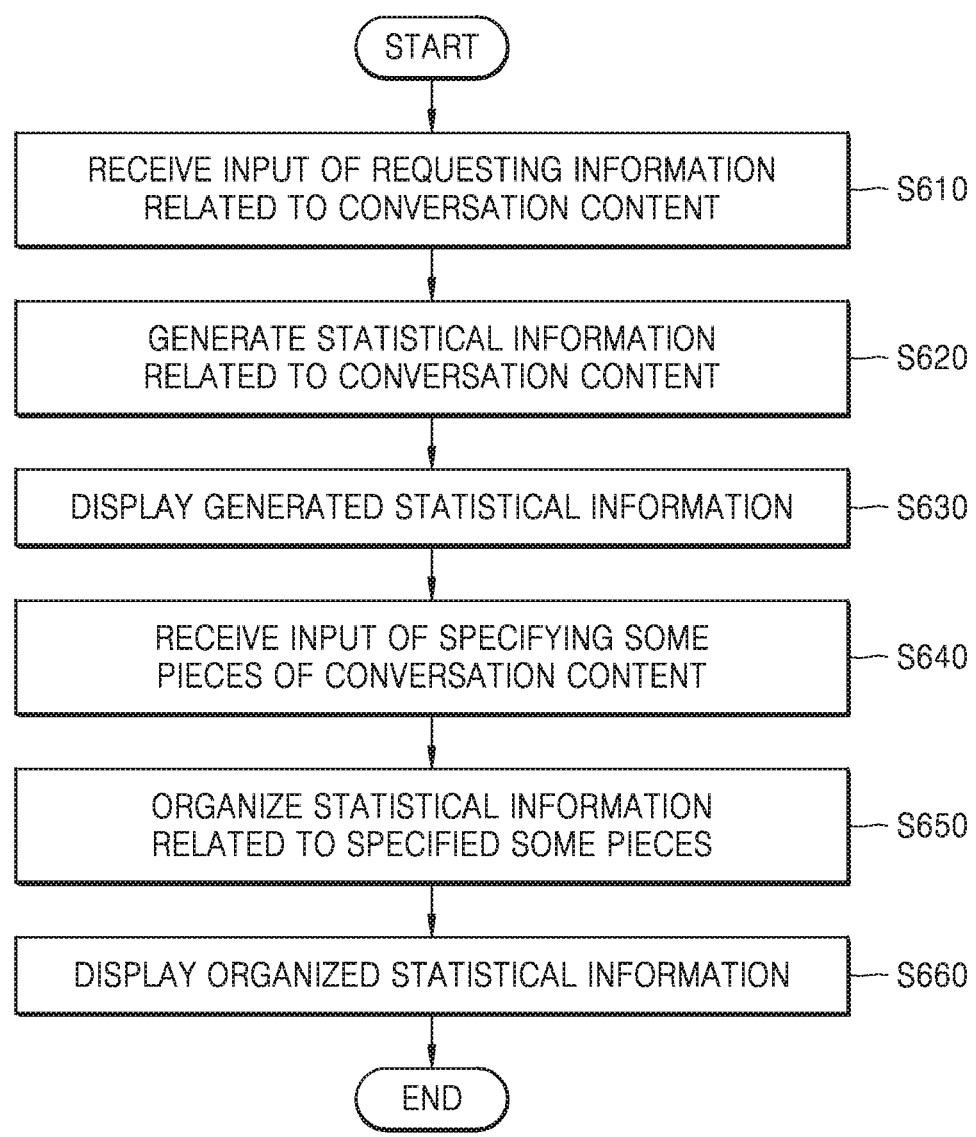

FIG. 6 is a flowchart of a method of providing a chat service according to example embodiments.

Referring to FIG. 6, in some example embodiments, as illustrated in FIG. 6, the apparatus 100 may first display the statistical information related to the all pieces of the conversation content at a point of time when the first input is received, and then display the statistical information related to the specified some pieces at a point of time when the second input is received.

For example, the apparatus 100 may receive an input of requesting information related to conversation content, in operation S610, and generate statistical information related to the conversation content, in operation S620. Operations S610 and S620 may be substantially similar to operations S510 and S520, and, thus, repeated description will be omitted for the sake of brevity.

In operation S630, the apparatus 100 may then display the statistical information on a calendar UI before an input of specifying some pieces of the conversation content is received.

Then, in operation S640, the apparatus 100 may receive the input of specifying some pieces of the conversation content.

In operation S650, the apparatus 100 may organize statistical information related to the specified some pieces, and, in operation S660, the apparatus 100 may then display the organized statistical information on the calendar UI.

As such, the apparatus 100 may display statistical information related to all pieces of conversation content through a calendar UI from a moment when a user inputs a first input of requesting the statistical information, and then change content of the calendar UI when the user inputs a second input of requesting statistical information related to specific pieces of the conversation content.

Figure 11:
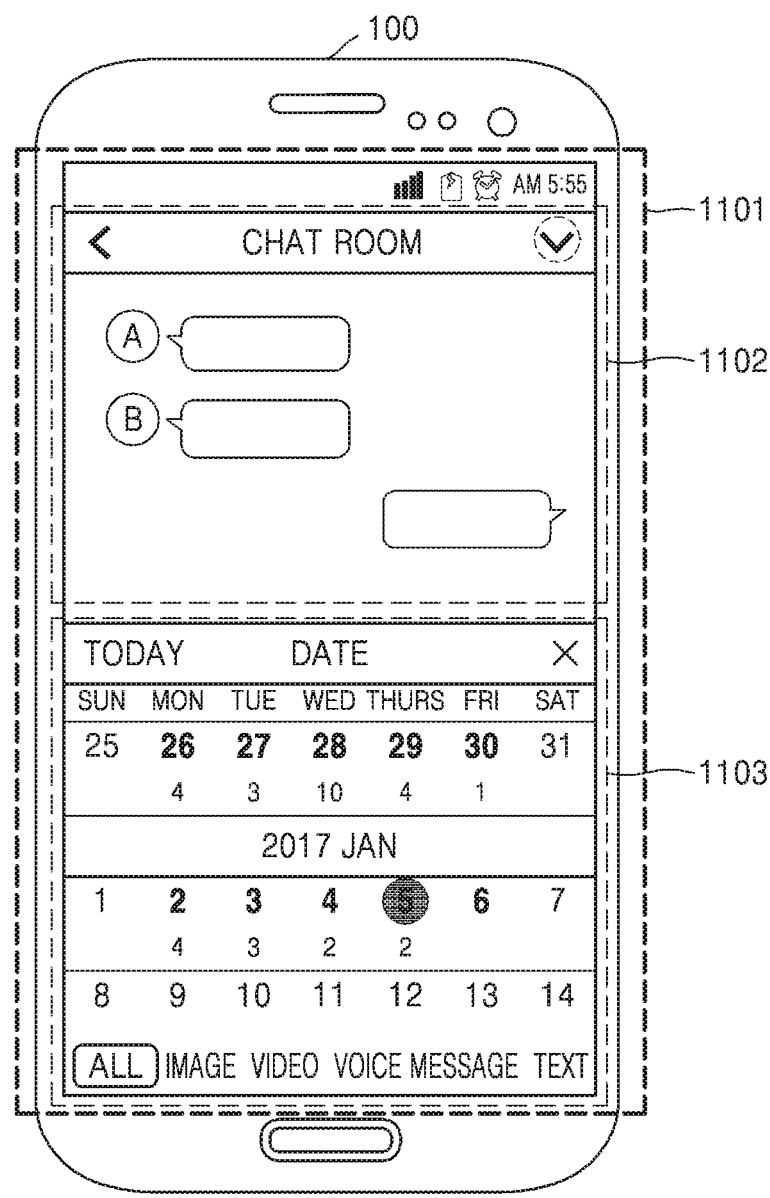

FIG. 11 illustrates an example of providing a chart service by an apparatus for providing a chat service, according to example embodiments.

Referring to FIG. 11, the apparatus 100 may display a chat room UI 1102 in at least a part of a display area 1101 of the apparatus 100, and display a calendar UI 1103 in at least another part of the display area 1101.

For example, when a chat room and a calendar are displayed in different screens from the viewpoint of the user of the apparatus 100, after selecting a specific date from the calendar and checking conversation content in the chat room on the specific date, the user may have to change the screen to the calendar again to see another date. In this regard, as shown in FIG. 11, the apparatus 100 displays the chat room UI 1102 and the calendar UI 1103 in one display area 1101 to provide user convenience.

According to one or more embodiments, an apparatus, method, and/or non-transitory computer readable medium storing computer program for providing a chat service may provide, according to certain time, statistical information related to past conversation content when providing a multi-party chat service.

According to one or more embodiments, an apparatus, method, and/or non-transitory computer readable medium storing computer program for providing a chat service may provide, according to certain time, statistical information related to a certain type of conversation content among past conversation content when providing a multi-party chat service.

According to one or more embodiments include an apparatus, method, and/or non-transitory computer readable medium storing computer program for providing a chat service may provide statistical information related to past conversation content when providing a multi-party chat service, and when a user selects a specific time slot based on the statistical information, display conversation content transmitted and received at the certain time slot.

The foregoing description has been provided for purposes of illustration and description. It is not intended to be exhaustive or to limit the disclosure. Individual elements or features of a particular example embodiment are generally not limited to that particular embodiment, but, where applicable, are interchangeable and can be used in an example embodiment, even if not specifically shown or described. The same may also be modified in various ways. Such modifications are not to be regarded as a departure from the example embodiments, and all such modifications are intended to be included within the scope of the example embodiments.

What is claimed is:

1. A method of providing a chat service, the chat service facilitating an exchange of a conversation through chat rooms on-line between an apparatus and at least one external electronic device, the method comprising:
   receiving, by an input device associated with the apparatus, a first input requesting information related to a conversation content, the conversation content including one or more types of content, the types of content including text content, voice content, image content, and video content of the conversation in a selected chat room of the chat rooms, the first input indicating which of the chat rooms is the selected chat room;
   receiving, by the input device, a second input specifying a selected content type from among the types of content;
   determining, by a controller associated with the apparatus, statistical information related to the conversation content of the selected content type within a time frame based on the first input and the second input such that the controller filters the statistical information based on the selected content type; and displaying, by a display device associated with the apparatus, the statistical information related to the selected chat room.

2. The method of claim 1, further comprising:
receiving, by the input device, a selection input selecting a specific time from the time frame; and
displaying, in the selected chat room, the statistical information for the selected content type transmitted and received at the specific time.

3. The method of claim 1, further comprising:
receiving, by the input device, a selection input selecting a specific time from the time frame; and
displaying, by the display device, at least some pieces of the conversation content transmitted and received at the specific time while maintaining the displaying of the statistical information.

4. The method of claim 1, wherein the time frame is one or more dates,
the determining the statistical information includes organizing the statistical information according to the dates, and
the displaying includes displaying the statistical information within a digital calendar such that the dates are distinguished.

5. The method of claim 4, wherein
the determining the statistical information includes determining a number of the conversation content that exist according to the selected content type and the dates, and
the displaying further includes displaying, on the digital calendar, an indication of the number of the conversation content that are of the selected content type.

6. The method of claim 5, wherein the indication is a number equal to the number of the conversation content that are of the selected content type.

7. The method of claim 4, wherein the displaying further includes displaying the digital calendar based on a date when the conversation content displayed on the display device was transmitted and received at a point of time when the first input is received.

8. The method of claim 4, wherein the displaying further includes displaying the digital calendar based on a date when the statistical information is requested.

9. The method of claim 1, wherein the determining the statistical information comprises:
determining, according to the time frame, the statistical information related to all the conversation content based on the first input; and
determining, according to the time frame, the statistical information related to the conversation content that are of the selected content type based on the second input.

10. The method of claim 9, wherein the time frame are one or more dates, and the displaying further comprises:
displaying the statistical information related to all the conversation content on a digital calendar such that the dates are distinguished; and
displaying the statistical information of the conversation content that are of the selected content type on a digital calendar such that the dates are distinguished.

11. The method of claim 1, further comprising:
receiving, by the input device, a selection input selecting at least one specific time from the time frame; and
deleting, by the controller, the conversation content associated with the at least one specific time from the selected chat room.

12. A non-transitory computer readable medium storing program code that, when executed, configures a processor associated with the apparatus to execute the method of claim 1.

13. An apparatus configured to provide a chat service, the chat service facilitating an exchange of a conversation through chat rooms on-line between the apparatus and at least one external electronic device, the apparatus comprising:
an input device configured to,
receive a first input requesting information related to a conversation content, the conversation content including one or more types of content, the types of content including text content, voice content, image content, and video content of the conversation in a selected chat room of the chat rooms, the first input indicating which of the chat rooms is the selected chat room, and
receive a second input specifying a selected content type from among the types of content;
a controller configured to determine statistical information related to the conversation content of the selected content type within a time frame based on the first input and the second input such that the controller filters the statistical information based on the selected content type; and
a display device configured to display the statistical information related to the selected chat room.

14. The apparatus of claim 13, wherein the selected chat room is a virtual logical space defined on-line to exchange the conversation with the at least one external electronic device.

* * * * *